Dec. 16, 1947.                D. G. C. LUCK                 2,432,778
                         BEARING INDICATING DEVICE
                    Filed May 13, 1943        2 Sheets—Sheet 1
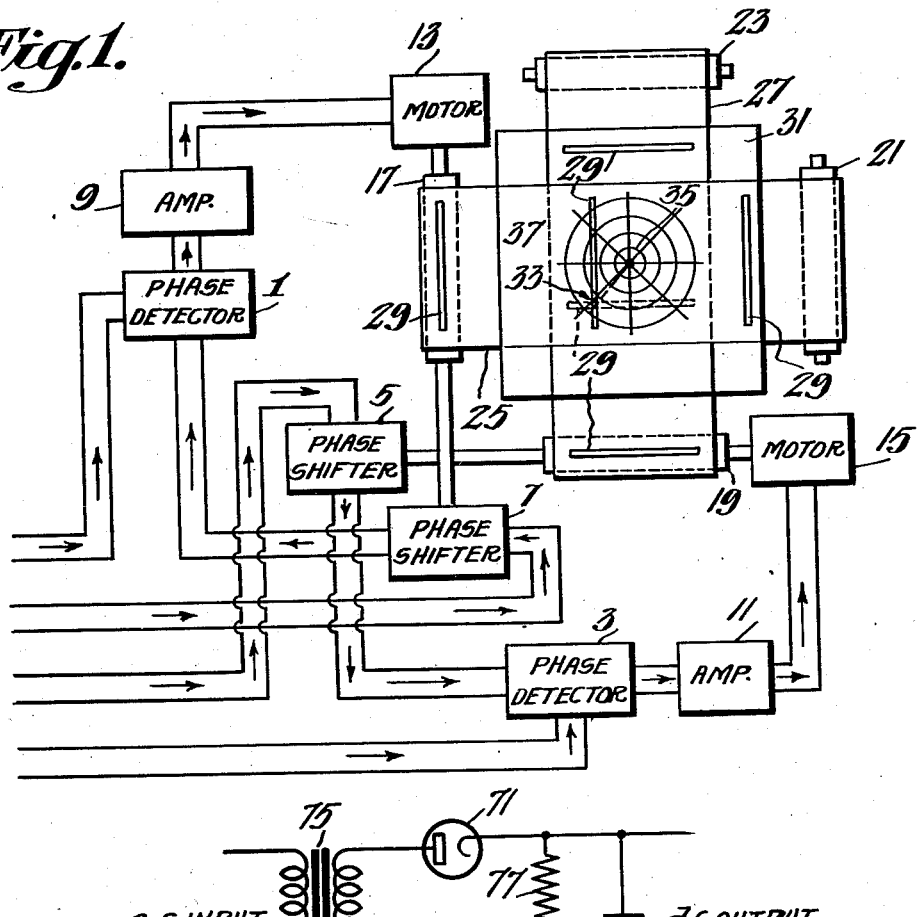
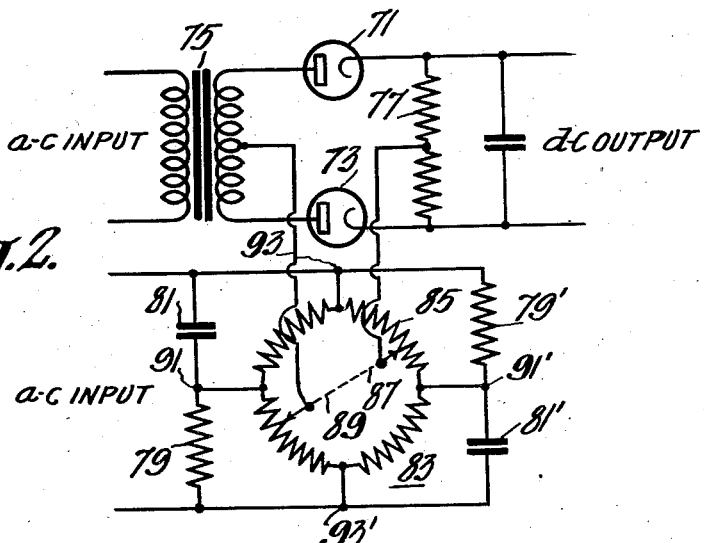
Inventor
David G. C. Luck
By
Attorney Dec. 16, 1947.                    D. G. C. LUCK                    2,432,778
                              BEARING INDICATING DEVICE
                  Filed May 13, 1943                    2 Sheets-Sheet 2
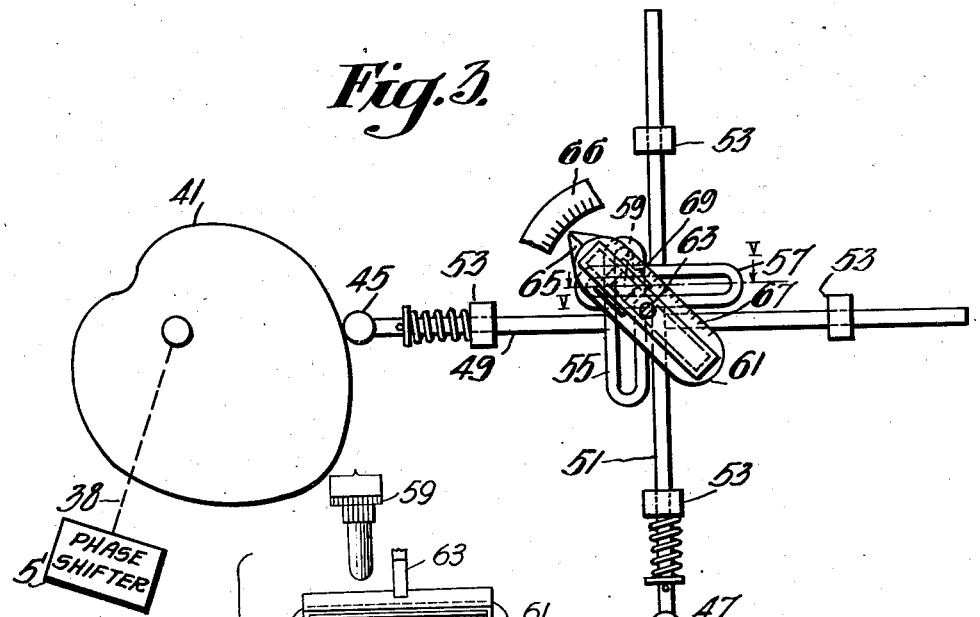
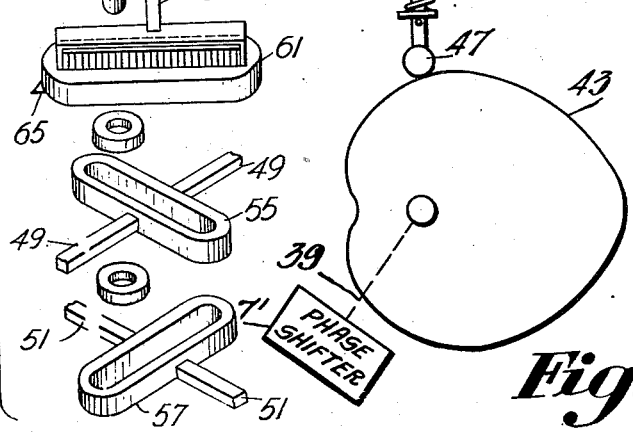
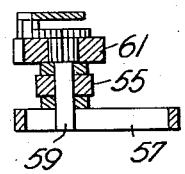
Inventor
David G. C. Luck
By
Attorney Patented Dec. 16, 1947

2,432,778

UNITED STATES PATENT OFFICE 2,432,778

BEARING INDICATING DEVICE

David G. C. Luck, Hightstown, N. J., assignor to Radio Corporation of America, a corporation of Delaware Application May 13, 1943, Serial No. 486,800

5 Claims. (Cl. 250—11)

This invention relates to direct indication and more particularly to the geometric composition of vectors automatically to indicate a resultant of two or more component vectors.

The problem of vector composition arises in many fields. One example is in radio direction finding systems, wherein an array of spaced antennas provide information as to the relative phases of an incoming signal at the locations of the individual antennas. This information may be made available as phase differences between low frequency currents by heterodyning the output of a local oscillator with the signals picked up by the antennas. If the directional array comprises two pairs of antennas spaced along two mutually perpendicular horizontal lines, as in the familiar Adcock arrays, these electrical phase differences are the rectangular components of a vector which is a horizontal projection of a vector lying along the direction of wave arrival. The length of this horizontal projection is a function of the frequency of the arriving wave and of the antenna spacing.

It is sufficient for the purpose of radio direction finding to obtain only the horizontal projection. This may be done by means of a cathode ray tube as described in copending U. S. application Ser. No. 432,841 filed February 28, 1942 by David G. C. Luck. In some cases, however, a mechanical arrangement is to be preferred. The phase differences can be transformed into mechanical motions by means of phase responsive servo systems and a vector composition mechanism.

It is the principal object of the present invention to provide an improved method of and means for mechanical vector composition in response to phase differences such as may be derived from a spaced antenna radio direction finder system.

This and other objects will become apparent to those skilled in the art upon consideration of the following description with reference to the accompanying drawing of which Fig. 1 is a schematic diagram of a phase responsive vector composition mechanism embodying the instant invention, Fig. 2 is a schematic circuit diagram of a phase responsive servo system, and Figs. 3, 4 and 5 are schematic diagrams of a modified vector composition mechanism.

Referring to Fig. 1 the low frequency output circuits of a direction finder system, not shown, are connected to a pair of phase detectors 1 and 3. It is assumed, for the sake of simplicity of explanation, that the antenna pairs lie on the north, south and east, west lines respectively. The low frequency voltage derived from the north antenna is applied indirectly to a phase detector 1. The voltage from the south antenna is applied through a variable phase shifter 7 to the phase detector 1. The voltage from the west antenna is applied directly to the phase detector 3 and the voltage from the east antenna is applied through a variable phase shifter 5 to the phase detector 3. The output circuits of the phase detectors 1 and 3 are connected through amplifiers 9 and 11 respectively to reversible D.-C. motors 13 and 15. The shaft of the motor 13 is mechanically conected to a roller 17 and to the variable phase shifter 7. The shaft of the motor 15 is similarly coupled to a roller 19 and the variable phase shifter 5. The rollers 17 and 19 are disposed at right angles to each other as indicated in Fig. 1. A second pair of rollers 21 and 23 are arranged to cooperate with the rollers 17 and 19 respectively to support a pair of endless belts 25 and 27 for motion at right angles to each other. The length of each of the belts 25 and 27 is an integral number of times the circumference of the supporting rollers. Each of the belts 25 and 27 carries transverse marking bars 29 of length and spacing each equal to the roller circumference. A transparent scale 31 is supported over the belts 25 and 27. The scale 31 is provided with concentric circular markings and radial lines centered over the region in which the belts cross. The belts 25 and 27 are made of opaque material. The marking bars 29 on the upper belt 25 comprise transparent slots. The bars 29 on the lower belt 27 may be transparent, or opaque and of color contrasting to that of the belt material.

The operation of the system of Fig. 1 is as follows:

The magnitudes and polarities of the outputs of the phase detectors 1 and 3 depend upon the relative phases of the respective pairs of inputs, as described below with reference to Fig. 2. The phase detector outputs are amplified by the amplifiers 11 and 9 respectively and applied to the motors 13 and 15. The motor 13 is energized by the amplifier 9 to drive the phase shifter 7 to a position such that the two inputs to the phase detector are 90° out of phase with each other, causing the output of the detector to decrease to zero and thus deenergize the motor 13. At this time the shaft of the phase shifter 7 and the roller 17 occupy angular positions corresponding to the difference in phase between the inputs from the north and south antennas. Any change in this phase difference causes a corresponding change in the difference in phase between the two inputs to the phase detector 1, which accordingly produces a D.-C. output voltage of a polarity depending upon which of the inputs leads the other in phase. This D.-C. output controls the amplifier 9 to energize the motor 13 to run in the proper direction to reestablish the 90 relationship between the inputs to the detector 1. Thus the roller 17 is maintained substantially continuously in an angular position corresponding to the difference in phase between the north and south antennas. The roller 19 is similarly driven to a position corresponding to the difference in phase between the voltages from the east and the west antennas by the motor 15.

Since the marking bars on the belts 25 and 27 are spaced from each other by a distance equal to the circumferences of the supporting rollers, one and only one marking bar on the upper belt will cross only one marking bar on the lower belt at any position of the rollers 17 and 19. The point of intersection 33 lies at such a position that a line 37 drawn from the point 33 to the center 35 of the scale 31 will lie in a direction corresponding to the azimuth represented by the relative phases of the input voltages. Thus the angular position of the point 33 provides a direct bearing indication upon the scale 31. The radial distance of the point 33 from the center 35 is a function of the signal frequency, the antenna spacing and the elevation of the wave arrival. This distance may be determined with reference to the circular graduations on the scale 31 and the information converted by means of nomographic charts or tables to determine the elevation. Since only one pair of marking bars can intersect at a time, the indication is unambiguous and no restraint is placed upon free rotation of the phase shifters 5 and 7 and motors 13 and 15. If a phase difference goes beyond the normal range, for example when the system is tuned from one station, having a bearing of less than 180° to one having a bearing of more than 180°, another mark 29 on the corresponding belt comes into action.

Numerous modifications of the device are possible. For example, the upper belt may be opaque, white, and marked by transparent slits, while the under belt is opaque, white, and marked by black lines, giving an indication as a black dot marking the tip of the vector resultant of the two inputs. The upper belt may be transparent with marks like those of the under belt providing a crossed line indication. Both belts may be transparent, marked with opaque lines and moved over a background which bears the scale and may, if desired, be luminous. A further possibility lies in the use of two opaque belts with transparent slits and a luminous background providing a bright dot indication.

Referring to Fig. 2, the phase detectors 1 and 3 each comprise a pair of diodes 71 and 73 connected symmetrically with an input transformer 75 and output resistors 77. One of the variable phase directional input voltages is applied across the transformer primary. The phase shifters 5 and 7 each comprise a phase splitting network including resistors 79 and 79' and capacitors 81 and 81'. This network is connected to a voltage divider 83 comprising a resistor 85 and a pair of angularly movable contact arms 87 and 89.

The resistor 85 is wound in a circular form with its ends connected together. The junction points 91 and 91' between the elements 79, 81 and 79', 81' respectively are connected to diametrically opposite points on the resistor 85. The junction points 93 and 93' between the elements 79', 81 and 79, 81' respectively are connected to diametrically opposite points on the resistor 85 90° away from the points of connection of the junctions 91 and 91'. The other input voltage is applied to the phase splitting network at the points 93 and 93'. The resistors 79 and 79' and the capacitors 81 and 81' are related to each other so that the voltage between the points 91 and 91' is 90° out of phase with the voltage applied to the points 93 and 93'. The variable sliders 87 and 89 are connected to the midpoints of the input and output resistors 77 and 75 respectively. The sliders 87 and 89 are mechanically connected together, as indicated by the dash line 95, and are coupled to a common control shaft, not shown.

The operation of the system of Fig. 2 is as follows:

One directional input voltage is applied to the anodes of the diodes 71 and 73 in opposite polarities. The other input voltage is applied to the anodes of the diodes 71 and 73 through the phase shifter in the same polarity. When the two input voltages are in phase at the diode 71, they are out of phase at the diode 73, causing the diode 71 to conduct during alternate half cycles while the diode 73 does not conduct. This causes current to flow through the upper half of the output resistor 77 so that the upper end of the output resistor is positive with respect to the lower end. When the directional input voltages are out of phase at the diode 71, they are in phase at the diode 73, causing conduction through the diode 73 and current through the lower half of the resistor 77. This causes the lower end of the resistor 77 to become positive with respect to the upper end. The magnitude of the voltage across the resistor 77 is a function of the phase angle between the input voltages to the diode network. When the two input voltages are 90° out of phase with respect to each other, both diodes conduct during period of equal length so that the resultant voltage across the resistor 77 is zero.

Figs. 3, 4 and 5 show a modified vector composition mechanism suitable for providing mechanical output for the operation of a physical pointer or the like. Phase shifters 5' and 7', similar to the phase shifters 5 and 7 of Fig. 1 but arranged to provide 720° phase change for one shaft rotation, are coupled mechanically as indicated by the dash lines 38 and 39 to two double spiral cams 41 and 43 respectively. The cams 41 and 43 are engaged by followers 45 and 47 supported on rods 49 and 51 and guided for motion radially of the respective cams by means of bearings 53. The rods 49 and 51 are provided with slotted crossheads 55 and 57, engaging a pin 59 at the intersection of the slots. An arm 61 is supported for pivotal motion about an axis 63, extending through the central position of the pin 59. The arm 61 is provided with a slot 62 engaging the pin 59. The angular position of the pin 59 with respect to the center 63 is a unique function of the angular positions of the cams 41 and 43. The arm 61 is moved by the pin 59 to a corresponding angular position. An index 65 may be provided at the end of the arm 61 for cooperation of a suitable scale 66 to provide bearing indication. A scale 67 may be provided on the arm 61 against which an index 69 on the pin 59 may be read to indicate the elevation of angle.

Although the system of Fig. 3 has been described as applied to the purpose of indication, it is to be understood that the mechanical output of the device may be employed to operate a position plotter or any other desired mechanism.

I claim as my invention:

1. In a radio direction finder system wherein the azimuth of arrival of a radio wave is indicated in terms of the phase of two A.-C. voltages, a pair of phase responsive servo mechanisms each connected to respond to the difference in phase between one of said A.-C. voltages and a reference A.-C. voltage, two members mechanically disposed for motion at right angles to each other, one of said members being connected to each of said servo mechanisms, linear marking means provided on each of said members and extending transversely thereon at right angles to the direction of motion thereof, and means for indicating position of the intersection of said marking means.

2. In a radio direction finder system wherein the azimuth of arrival of a radio wave is indicated in terms of the phase of two A.-C. voltages, a pair of members disposed for motion at right angles to one another, slots provided in said members at right angles to the direction of motion thereof, electric motors coupled to said members, phase responsive detectors connected to control the power input to said motors, means for applying one of said A.-C. voltages to each of said detectors, means including variable phase shifters for applying a reference phase input to each of said detectors, mechanical connections from each of said motors respectively to each of said phase shifters, whereby said movable members are positioned so that said slots cross each other at the position which represents said azimuth of arrival.

3. The invention as set forth in claim 2 including a longitudinal slot indicator bar supported for pivotal motion about the common central position of the slots in said movable members, and a pin extending through the slots in said movable members and said indicating bar.

4. The invention as set forth in claim 2 wherein said movable members comprise endless belts supported on rollers having perimeters equal to the length and spacing of said slots.

5. The invention as set forth in claim 2 wherein the mechanical connections from said motor to said movable members including double spiral cams, and said phase shifters are arranged to provide phase shifts of 720 electric degrees for each rotation of the shifts thereof.

DAVID G. C. LUCK.